United States Patent
Harvey (10) Patent No.: US 11,160,372 B2
(45) Date of Patent: Nov. 2, 2021

(54) SLIDING SUPPORT ASSEMBLY USING RETAINING STRIPS

(71) Applicant: ACCURIDE INTERNATIONAL LIMITED, Northampton (GB)

(72) Inventor: Michael David Harvey, Northampton (GB)

(73) Assignee: Accuride International Limited, Northampton (GB)

( * ) Notice: Subject to any disclaimer, the term of this patent is extended or adjusted under 35 U.S.C. 154(b) by 534 days.

(21) Appl. No.: 16/084,189

(22) PCT Filed: Apr. 11, 2017

(86) PCT No.: PCT/GB2017/051004
§ 371 (c)(1),
(2) Date: Sep. 11, 2018

(87) PCT Pub. No.: WO2017/178805
PCT Pub. Date: Oct. 19, 2017

(65) Prior Publication Data
US 2020/0291996 A1    Sep. 17, 2020

(30) Foreign Application Priority Data
Apr. 13, 2016 (GB) .................................. 1606387

(51) Int. Cl.
*A47B 88/487* (2017.01)
*A47B 88/493* (2017.01)
(Continued)

(52) U.S. Cl.
CPC .......... *A47B 88/487* (2017.01); *A47B 88/477* (2017.01); *A47B 88/493* (2017.01);
(Continued)

(58) Field of Classification Search
CPC .. F16C 33/3806; F16C 29/005; F16C 29/048; A47B 88/487; A47B 88/14;
(Continued)

(56) References Cited

U.S. PATENT DOCUMENTS 2,812,222 A * 11/1957 Gussack ............... F16C 33/427
384/49
4,252,382 A   2/1981 Eberhard
(Continued)

FOREIGN PATENT DOCUMENTS

CN    203 651 511 U    6/2014
EP       0011675 A1    6/1980
(Continued)

OTHER PUBLICATIONS

International Search Report for International Patent Application No. PCT/GB2017/051004 by ISA/EP dated Jul. 17, 2017.
(Continued)

*Primary Examiner* — Andrew M Roersma
(74) *Attorney, Agent, or Firm* — Brian B. Shaw, Esq.; Harter Secrest & Emery LLP (57) ABSTRACT

An elongate rail (2) for use in a sliding support assembly (1), the sliding support assembly comprising a slide member (3) slidable in a longitudinal direction relative to the elongate rail and first (4a) and second locating assemblies, the elongate rail comprising a channel section defined by a first web, a first flange, and a second flange; a first wall (7a); and a second wall; wherein the first flange and the first wall (7a) define a first channel for retaining the first locating assembly (4a) and the second flange and the second wall define a second channel for retaining the second locating assembly.

13 Claims, 9 Drawing Sheets

(51) Int. Cl.
*A47B 88/477* (2017.01)
*F16C 29/00* (2006.01)
*F16C 29/04* (2006.01)
*F16C 33/38* (2006.01)

(52) U.S. Cl.
CPC .............. *A47B 2210/0021* (2013.01); *A47B 2210/0035* (2013.01); *F16C 29/005* (2013.01); *F16C 29/048* (2013.01); *F16C 33/3806* (2013.01)

(58) Field of Classification Search
CPC ..... A47B 88/493; A47B 88/10; A47B 88/483; A47B 88/473; A47B 88/477; A47B 88/497; A47B 88/49; A47B 88/08; A47B 2210/0018; A47B 2210/0021; A47B 2210/032; A47B 2210/0035; A47B 2210/0037; A47B 2210/004; A47B 2210/0081
See application file for complete search history.

(56) References Cited

U.S. PATENT DOCUMENTS

| | | | | |
|---|---|---|---|---|
| 5,575,565 A * | 11/1996 | Takei | ............. | F16C 29/004 384/44 |
| 5,735,214 A * | 4/1998 | Tsuboi | ............. | F16C 29/005 104/106 |
| 6,749,277 B2 * | 6/2004 | Michaels | ............. | A47B 88/487 312/334.5 |
| 8,646,741 B2 * | 2/2014 | Ishimoto | ............. | B60N 2/0722 248/429 |
| 2009/0267396 A1 | 10/2009 | Hofmann et al. | | |
| 2013/0200243 A1 | 8/2013 | Mischer et al. | | |
| 2013/0200244 A1 | 8/2013 | Werner et al. | | |

FOREIGN PATENT DOCUMENTS

| | | |
|---|---|---|
| EP | 0 197 638 A2 | 10/1986 |
| EP | 2025448 A1 | 2/2009 |
| EP | 2 202 115 A1 | 6/2010 |
| EP | 2 915 694 A1 | 9/2015 |
| JP | H09112550 A | 5/1997 |
| KR | 101 071 591 B1 | 10/2011 |
| WO | 2007/017688 A1 | 2/2007 |

OTHER PUBLICATIONS

International Written Opinion for International Patent Application No. PCT/GB2017/051004 by ISA/EP dated Jul. 17, 2017.
Chinese National Intellectual Property Administration (CNIPA), Office Action in CN Patent Application No. 201780023017.0, dated Mar. 20, 2020.

* cited by examiner

SLIDING SUPPORT ASSEMBLY USING RETAINING STRIPS

FIELD OF THE INVENTION

The present invention relates to sliding support assemblies and particularly to sliding support assemblies that use balls in retaining strips to provide relative linear motion between a slide member and an elongated rail.

BACKGROUND OF THE INVENTION

Sliding support assemblies are known in the art. Typically, such assemblies are used to permit linear motion between two or more components. A variety of potential setups may be achieved including one in which a slide member linearly translates, or slides, along an elongated rail. Such elongated rails and slide members generally are made from extruded lengths of aluminium or steel.

Sliding engagement between the slide member and the elongate rail is typically provided by a plurality of balls. The balls may be held in apertures in a retaining member located between the slide member and the elongate tail. The elongate rail is generally of shallow channel section. As an example of such a construction see the sliding supports described in WO2007017688A1.

As a consequence of this type of construction, the retaining member that holds the balls typically spans, or bridges, the shallow channel of the elongate rail. This results in a reduction in the space available within the elongate rail which, amongst other things, makes such support assemblies difficult to motorize in an unobtrusive way. The difficulty arises partly as the bridging part of the retaining member gets in the way of modifications that are necessary to couple the slide member to a motor.

The use of two separate retaining strips on either side of the shallow channel of the elongate rail alleviates this particular difficulty. However, typically the use of such retaining strips is associated with a tendency of the strips to move away from the sides of the shallow channel of the elongate rail. Strips that have moved away from the edges may damage other components or be damaged themselves and cause the assembly to become jammed.

Accordingly, there is a need to provide a sliding support assembly or its components thereof that addresses the problem of the retaining strips moving away from their appropriate position within the elongate rail.

SUMMARY OF THE INVENTION

The present invention is defined by the claims with further optional features defined by the dependent claims.

According to a first aspect of the invention, there is provided an elongate rail for use in a sliding support assembly, the sliding support assembly comprising a slide member slidable relative to the elongate rail and first and second locating assemblies, the elongate rail comprising:
  a channel section defined by a first web, a first flange, and a second flange;
  a first wall; and
  a second wall;
wherein the first flange and the first wall define a first channel for retaining the first locating assembly, and the second flange and the second wall define a second channel for retaining the second locating assembly.

The first flange may have a first lip configured to partially surround the first locating assembly, and the second flange may have a second lip configured to partially surround the second locating assembly.

The first lip may extend in a plane which is parallel to a plane in which the first flange extends, and the second lip may extend in a plane which is parallel to a plane in which the second flange extends.

The top of the first wall and the end of the first lip may be separated by a first distance, and the top of the second wall and the end of the second lip may be separated by a second distance.

Preferably, the first distance and the second distance are both 5.5 mm.

The first lip may be located further from the first web than the top of the first wall, and the second lip may be located further from the first web than the top of the second wall.

Preferably, the first web extends in a first plane, the first flange extends in a second plane, and the second flange extends in a third plane, wherein the second and third planes in directions that are parallel to each other and perpendicular to the first plane that the first web.

Preferably, the first wall extends in a fourth plane, and the second wall extends in a fifth plane, wherein the fourth and fifth planes are: parallel to each other, parallel to the second and third planes, and perpendicular to the first plane.

The first channel may be configured to retain the first locating assembly within the first channel, and the second channel may be configured to retain the second locating assembly within the second channel.

A top portion of the first wall may be configured to curve away from the first flange out of the fourth plane, and a top portion of the second wall may be configured to curve away from the second flange out of the fifth plane.

Preferably, in the longitudinal direction of the elongate rail: the first wall does not extend to an end of the elongated rail, and the second wall does not extend to an end of the elongated rail.

Preferably, in the longitudinal direction of the elongate rail: the first lip does not extend, in the longitudinal direction of the elongate rail, to an end of the first wall, and the second lip does not extend, in the longitudinal direction of the elongate rail, to an end of the second wall.

An end of the elongated rail, in the longitudinal direction of the elongate rail, may have a limiting feature for limiting the movement of the slide member. The limiting feature may be composed of one or more slots, cut into the first web, that are bent into the channel section.

The first flange may have a first groove shaped to locate the first locating assembly therein, and the second flange may have a second groove shaped to locate the second locating assembly therein.

According to a second aspect of the invention, there is provided a sliding support assembly comprising:
  the elongate rail of the first aspect described above; and
  the slide member in slidable contact with the first and second locating assemblies.

Preferably, the slide member comprises a channel section defined by a second web, a first sliding flange, and a second sliding flange.

Preferably, a portion of the first sliding flange extends in a sixth plane, a portion of the second sliding flange extends in a seventh plane, and the second web extends in an eighth plane, wherein the sixth and seventh planes are: parallel to each other, parallel to the fourth and fifth planes, and perpendicular to the first and eighth planes.

A first portion of the first sliding flange may be configured to curve towards the first flange, and a first portion of the second sliding flange may be configured to curve towards the second flange. The curved portions may be the portions of the sliding flanges that are closest to the second web.

A top portion of the first wall may be configured to match the curvature of the first portion of the first sliding flange, and a top portion of the second wall may be configured to match the curvature of the first portion of the second sliding flange. The first portion of the first sliding flange may be parallel to the top portion of the first wall, and the first portion of the second sliding flange may be parallel to the top portion of the second wall.

The first sliding flange may have a first sliding groove to locate the first locating assembly therein, and the second sliding flange may have a second sliding groove to locate the second locating assembly therein.

The slide member may be shorter, in the longitudinal direction of the elongate rail, than the elongated rail.

According to a third aspect of the invention, there is provided a sliding support assembly comprising:
the elongate rail of the first aspect described above;
the first locating assembly; and
the second locating assembly.

The first locating assembly may comprise a first retaining strip and a first series of balls, and the second locating assembly may comprise a second retaining strip and a second series of balls.

The first series of balls may be lubricated, and the second series of balls may be lubricated.

The first retaining strip may bow so that at least a portion of the first retaining strip presses against the first wall, and the second retaining strip may bow so that at least a portion of the second retaining strip presses against the second wall.

The first series of balls may be held in a first series of apertures in the first retaining strip, and the second series of balls may be held in a second series of apertures in the second retaining strip.

The first and second retaining strips may include retaining ribs which extend into the first and second series of apertures to retain the first and second series of balls in the respective apertures.

The apertures in the first series of apertures may be separated from each other by equal distances, and the apertures in the second series of apertures may be separated from each other by equal distances.

Preferably, the first retaining strip comprises a channel section defined by a first side, a first foot, and a first top lip; and the second retaining strip comprises a channel section defined by a second side, a second foot, and a second top lip.

Preferably, the first foot extends further from the first side than the first top lip, and the second foot extends further from the second side than the second top lip.

The first side may have a first bulbous portion, and the second side may have a second bulbous portion. In particular, the thickness of the bulbous portions may be greater than the thickness of the remaining portions of the first and second sides, respectively.

The first series of apertures may be located in the first bulbous portion, and the second series of apertures may be located in the second bulbous portion.

Preferably, the first retaining strip has an end wall located at an end of the first retaining strip, and the second retaining strip has an end wall located at an end of the second retaining strip. The first retaining strip may have an end wall located at each end thereof, and the second retaining strip may have an end wall located at each end thereof.

The or each end wall may have a chamfer on an inner edge thereof that allows each end wall to be pressed past the limiting feature.

The elongated rail of the first aspect of the invention, may further comprise a rack for coupling to a motor.

The slide member of the second aspect of the invention may further comprise a motor, wherein the motor is for sliding the elongate rail relative to the slide member.

The slide member of the second aspect of the invention may include a rack for coupling to a motor.

The sliding support assembly of the second aspect of the invention may further comprise a motor, wherein the motor is for sliding the slide member relative to the elongate rail. The motor may be mounted on the elongate rail.

According to another aspect of the invention, there is provided an elongate rail or a sliding support assembly substantially as hereinbefore described with reference to and as shown in the accompanying drawings.

According to another aspect of the invention, there is provided a sliding support assembly comprising: an elongate rail as described above in connection with the first aspect of the invention; and a slide member coupled to the elongate rail, wherein the slide member is substantially as hereinbefore described with reference to and as shown in the accompanying drawings.

According to another aspect of the invention, there is provided a sliding support assembly comprising:
an elongate rail as described above in connection with the first aspect of the invention;
the first locating assembly; and
the second locating assembly, wherein the first and second locating assembly are substantially as described herein with reference to and as shown in the accompanying drawings.

BRIEF DESCRIPTION OF THE FIGURES

By way of example, embodiment of a sliding support assembly and its associated components according to the present invention will now be described with reference to the accompanying drawings, in which.

It will be appreciated that the embodiments shown in the figures are by way of example only, and that alterations or modifications may be made within the scope of the invention as defined in the appended claims.

DETAILED DESCRIPTION OF THE FIGURES

Figure 3:
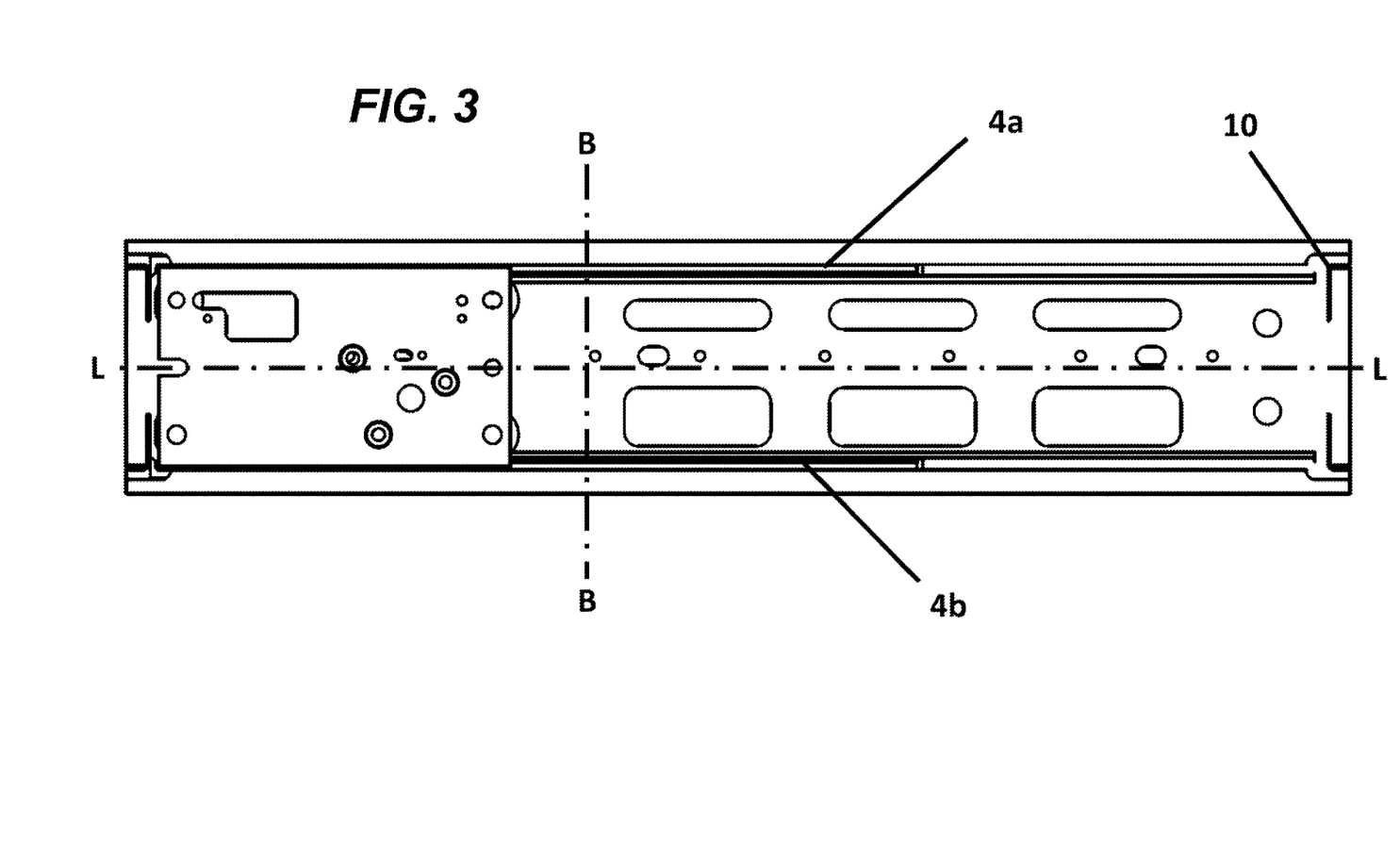
FIG. 3 is a top view of the sliding support assembly of FIG. 1.

It will be further appreciated that, for convenience and clarity, directional terms such as "longitudinal" or "traverse"

are used herein with respect to the drawings. In particular, as seen in FIG. 3, the longitudinal direction extends along the line L-L which corresponds to the direction in which the sliding motion of the slide member occurs. Relatedly, the traverse direction extends along the line B-B which is perpendicular to the L-L direction. However, support assemblies are used in many orientations and positions, and thus these terms are not intended to be limiting.

In general fillets, chamfers, or other component finishing techniques are not described unless they assist in highlighting particular functional aspects of a component. However, all edges may have chamfers, fillets, or other finishes for a variety of reasons, such as to reduce possible damage when they contact other objects or for aesthetic reasons, which would be clear to one skilled in the art.

Figure 1:
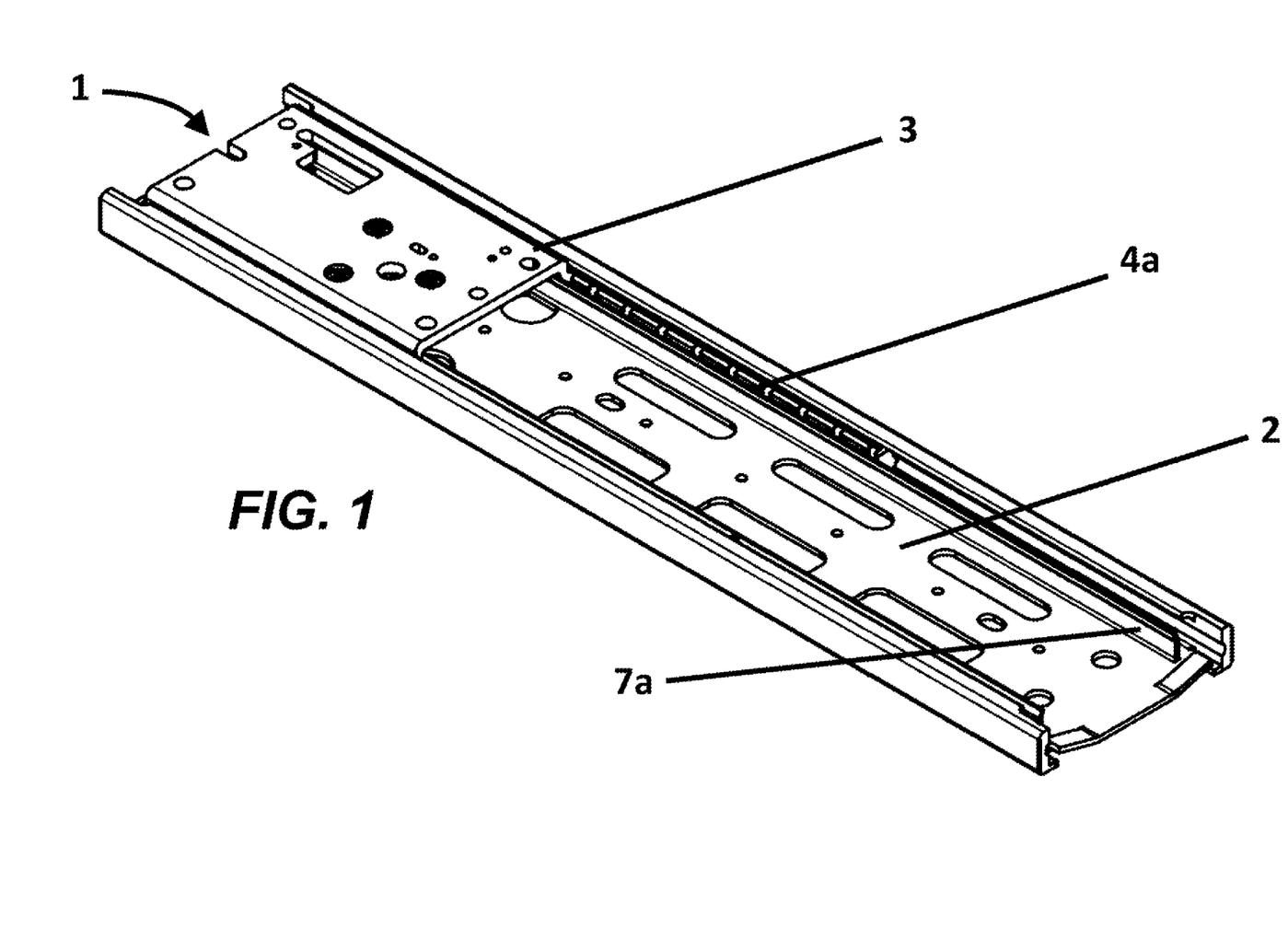
FIG. 1 is a perspective view of a sliding support assembly according to a first embodiment of the present invention.
Figure 2:
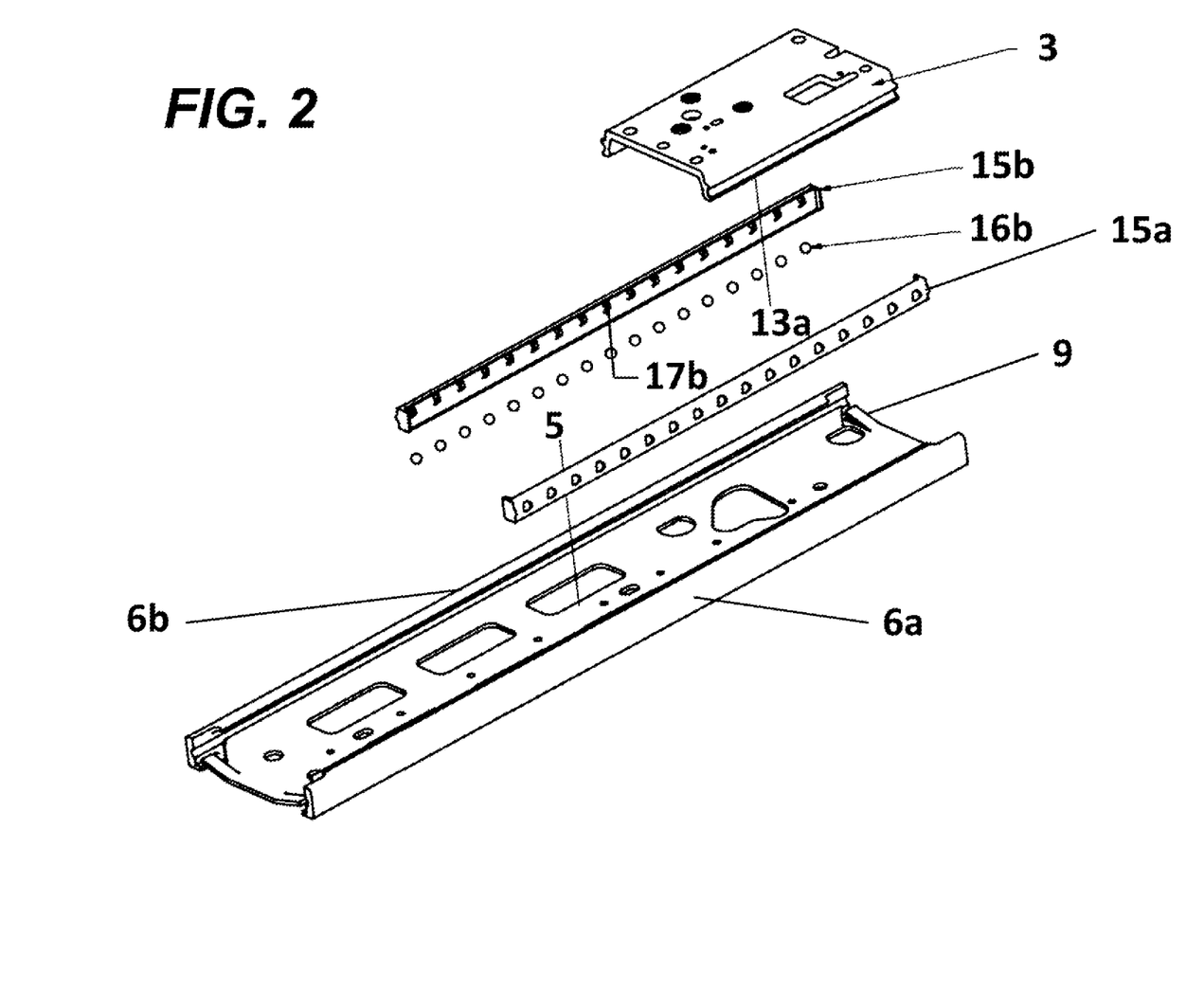
FIG. 2 is an exploded view showing the component parts of the sliding support assembly of FIG. 1.
Figure 4:
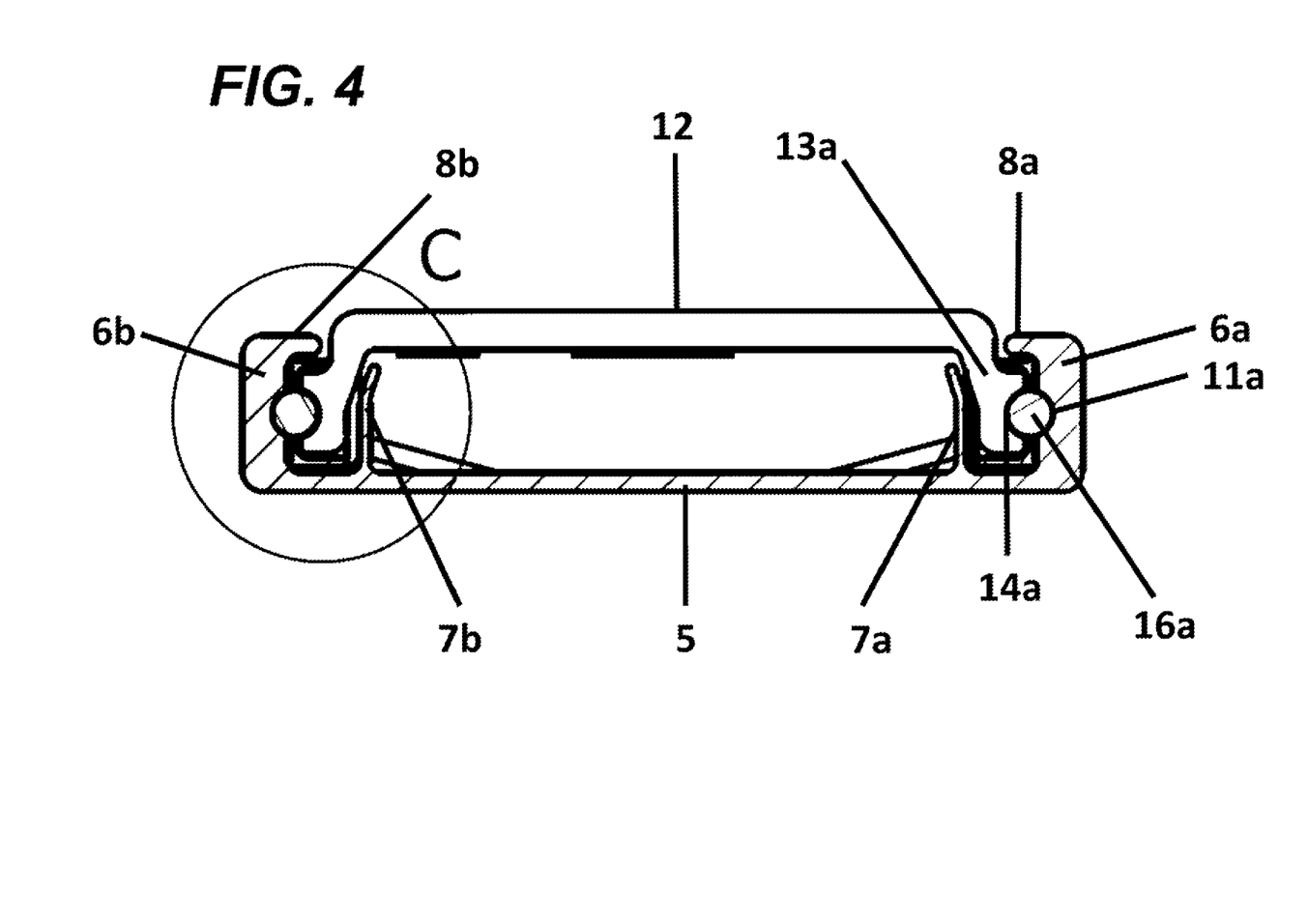
FIG. 4 is a sectional view of the sliding support assembly of FIG. 1, taken through the line B-B shown in FIG. 3.

As best seen in FIGS. 1 and 2, a first embodiment of the present invention provides a sliding support assembly 1. The sliding support assembly includes an elongate rail 2 according to the first aspect of the invention described above, a slide member 3 slidable relative to the elongate rail 2, and first 15a and second locating assemblies 15b. The sliding support assembly, best seen in FIGS. 1 and 2 is in accordance with the second and third aspects of the invention described above. As best seen in FIGS. 2 and 4, the elongate rail 2 comprises: a channel section defined by a first web 5, a first flange 6a, and a second flange 6b; a first wall 7a, and a second wall 7b; wherein the first flange 6a and the first wall 7a define a first channel for retaining the first locating assembly 15a and the second flange 6b and the second wall 7b define a second channel for retaining the second locating assembly 15b. The elongate rail 2 and slide member 3 may be made from extruded lengths of aluminium, or steel, or plastic, or other materials that would be known to a person skilled in the arts. Retaining the locating assemblies 15a, 15b in the channels also means that the locating assemblies 15a, 15b are maintained in close proximity, or in partial contact with, the flanges 6a, 6b. This proximity minimizes the risk of the locating assemblies moving away from the flanges by a sufficient distance to release components from, or have components shaken out of, the locating assemblies. This is especially important when the locating assemblies contains balls (as is described later).

The first web 5 extends in a first plane, and the first and second flanges 6a, 6b extend in second and third planes which are perpendicular to the first plane. The first and second flanges 6a, 6b extend in the same direction from the first web 5 at opposite sides thereof (when viewing the elongate rail along the longitudinal direction). The elongated rail 2 is formed "square", that is with the web 5 and flanges 6a, 6b terminating in traverse planes at either longitudinal end of the elongate rail. The elongate rail 2 is substantially symmetric about a central plane along the line L-L shown in FIG. 3 that is parallel to the second and third planes and located equidistant between the flanges 6a, 6b. The walls 7a, 7b extend in fourth and fifth planes which are parallel to the second and third planes, and serve to retain, by partially surrounding, the locating assemblies 15a, 15b within the first and second channels. Consequently, the locating assemblies 15a, 15b are retained in contact with or in close proximity to their associated flanges. As the walls 7a, 7b partially surround the locating assemblies 15a, 15b they, and the other features that further entomb or trap, the locating assemblies, serve to limit the risk of any object coming into contact with the locating assemblies 15a, 15b. Thus the risk of damage to the locating assemblies 15a, 15b by an object, or damage to an object by the locating assemblies 15a, 15b is reduced. A further advantage of the walls 7a, 7b is that they serve to increase the strength and rigidity of the elongate rail.

The dimensions of the channels in which the locating assemblies 15a, 15b are retained can be varied by changing the distance between the walls 7a, 7b and their associated flanges 6a, 6b or by changing the height of the walls 7a, 7b. In some cases, a tighter fitting channel may be used to maximize the span of the first web 5 that is available between the walls 7a, 7b for housing additional components. In other cases, each channel may be much bigger than the respective locating assembly to minimize the pressure between the locating assemblies and the walls, or to minimise the extent to which the locating assemblies are in contact with the walls.

As best seen in FIGS. 2 and 4, the first flange 6a has a first lip 8a positioned to partially surround the first locating assembly 15a and the second flange 6b has a second lip 8b positioned to partially surround the second locating assembly 15b. The lips 8a, 8b serve to further surround the locating assemblies 15a, 15b and to further retain them within the channels, particularly by limiting the distance the locating assemblies 15a, 15b can move away from the first web 5. As above, the dimensions of the walls 6a, 6b and lips 8a, 8b can be adjusted as necessary for particular locating assemblies or particular use.

The top of the first wall 7a and the inner end of the first lip 8a are separated by a first distance, and the top of the second wall 7b and the inner end of the second lip 8b are separated by a second distance. This distance can be set to match the applicable dimensions of the particular slide member that is used. In some aspects the first and second distances are both less than 20 mm, preferably less than 10 mm, and more preferably both are 5.5 mm. The gap can be selected as necessary according to the particular needs of a user. As an example, if the locating strips are lubricated and components on the other sides of the walls must be kept free from lubrication the gap should be as small as possible to allow the sliding flanges of the particular slide member to be received into the channels.

The first lip 8a is located further from the first web 5 than the top of the first wall 7a, and the second lip 8b is located further from the first web 5 than the top of the second wall 7b. This construction allows the lips 8a, 8b to further retain the locating assemblies 15a, 15b whilst maintaining the required first and second distance.

The first flange 6a extends in the second plane, and the second flange 6b extends in the third plane. The second and third planes are parallel to each other and perpendicular to the first plane that the first web 5 lies in. Avoiding oblique surfaces means that construction of the sliding assembly is easier as is coupling the sliding support assembly to external systems.

The first 7a and second walls 7b extend in the fourth and fifth planes respectively that are: parallel to each other, parallel to the second and third planes that the first 6a and second flanges 6b extend in, and perpendicular to the first plane that the first web 5 lies in. As above, avoiding oblique surfaces means that construction of the sliding assembly 1 is easier as is coupling the sliding support assembly 1 to external systems or coupling other systems or components within the sliding support assembly.

Figure 5:
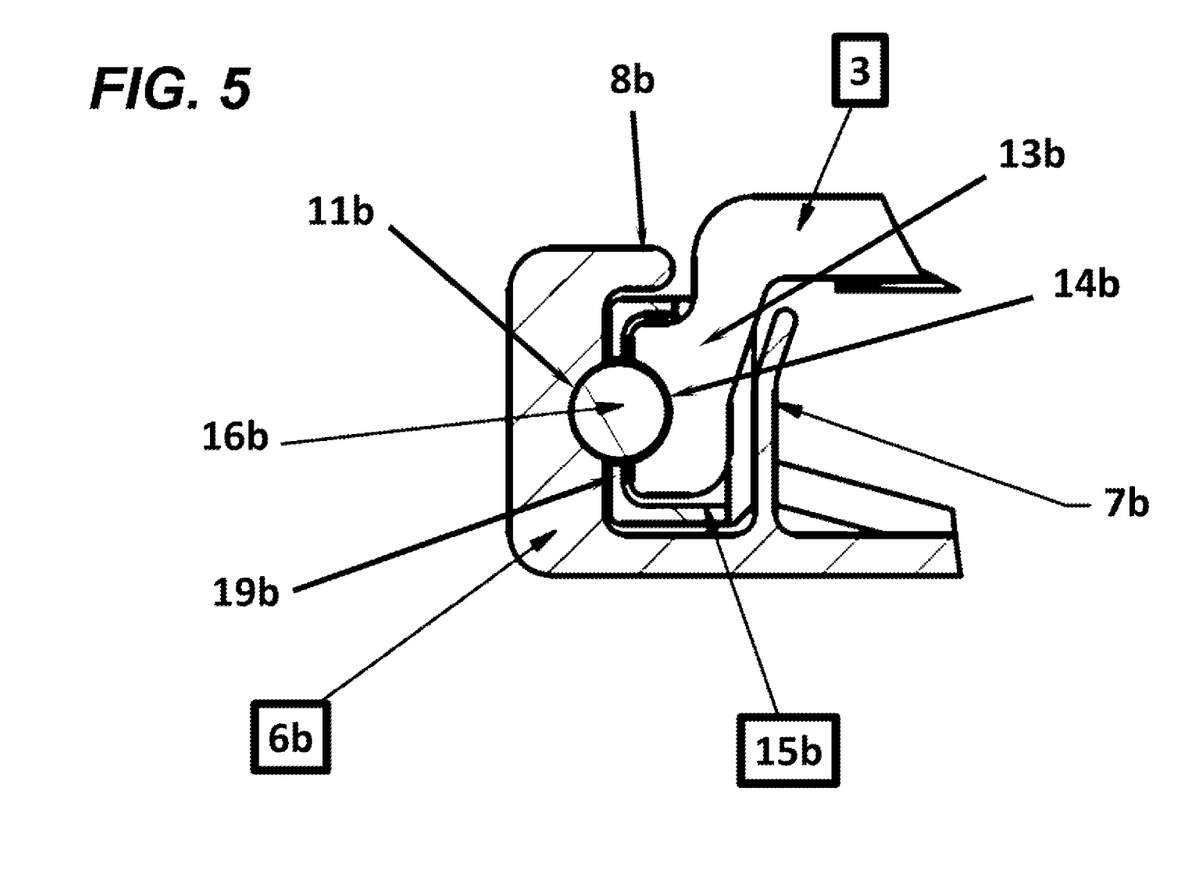
FIG. 5 is an enlarged view of the circled area, C, shown in FIG. 4.

As can be seen in FIG. 5, the first channel retains the first locating assembly 4a within the first channel, and the second channel retains the second locating assembly 4b within the second channel. Maintaining the locating assemblies 4a, 4b within their respective channels isolates them from outside interference and prevents them from contacting other surfaces.

A top portion of the first wall 7a is configured to curve away from the first flange 6a out of the fourth plane, and a top portion of the second wall 7b is configured to curve away from the second flange 7b out of the fifth plane. This assists in setting the first and second distance and also facilitates inserting the locating assemblies 15a, 15b and sliding flanges 13a, 13b of the slide member 3 into their respective channels.

As is best seen in FIGS. 1 to 3, the first wall 7a does not extend, in the longitudinal direction (L-L) of the elongate rail, to an end of the elongated rail, and the second wall 7b does not extend, in the longitudinal direction of the elongate rail, to an end of the elongated rail. Stopping the walls 7a, 7b short of the ends of the elongate rail means that there is space on the first web 5 to locate various other features.

The first lip 8a does not extend, in the longitudinal direction of the elongate rail, to an end of the first wall 7a, and the second lip 8b does not extend, in the longitudinal direction of the elongate rail, to an end of the second wall 7b. Stopping the lips 8a, 8b short again results in space to locate various other features. Furthermore, access for manufacturing tools to form the various other features is improved.

One such feature can be seen in FIG. 2. It is a limiting feature 9 for limiting the movement of the slide member, in the longitudinal direction of the elongate rail (L-L). This limiting features prevents the slide member from sliding past the end of the elongate rail. Making any limiting feature part of the elongate rail prevents the necessary addition of other limiting components and simplifies the manufacturing process.

The limiting feature 9 seen in FIG. 2 is formed by cutting one or more slots 10 into the first web 5, and then bending the feature 9 into the channel section of the elongate rail. Preferably, during the manufacture of the sliding support assembly the one or more slots 10 are in the un-bent condition and they are bent up during assembly. Hence, when the elongate rail is produced it may have one or more slots that are temporarily un-bent which are subsequently bent up as and when required. Alternatively, the elongate rail can be produced with all of the slots bent before assembly. Using bent portions as limiting features has the further advantage that they can be temporarily pushed down to allow the slide member, or other components that slide within the channels, to be pushed past the slots. This means that a slide member or other sliding components can be inserted without requiring disassembly of the sliding support. This is especially important if future replacement or maintenance of a slide member, elongate rail, or other component of the sliding assembly is likely. If, at a later stage, the slots needs to be removed it is also a simple matter of pushing the raised portion down so that it is in the plane of the first web 5.

As can be seen in FIGS. 4 and 5, the first flange 6a has a first groove 11a shaped to locate the first locating assembly 4a, and the second flange 6b has a second groove 11b shaped to locate the second locating assembly 4b. These grooves 11a, 11b serve to both limit the possible movement of the locating assemblies 4a, 4b and to ensure that the balls 16a, 16b of the locating assemblies roll on surfaces that are smooth, and at least partially conformal to the surface of the balls, thereby minimizing noise and possible rattle. As the ball contacting surfaces 11a, 11b are slightly recessed from the flange surfaces, risk of contamination or scratching of the ball contacting surfaces 11a, 11b is minimized.

As seen in FIGS. 1 and 4, the sliding support assembly 1 further comprises a slide member 3 in slidable contact with the first and second locating assemblies 7a, 7b. The slide member comprises a channel section defined by a second web 12, a first sliding flange 13a, and a second sliding flange 13b. This construction is similar, in some respects, to the elongated rail and, as before, this symmetry of the components assists in their incorporation into other systems.

The first 13a and second 13b sliding flanges extend in sixth and seventh planes respectively that are: parallel to each other, parallel to the fourth and fifth planes in which the first 7a and second walls 7b extend, and perpendicular to the first and eighth plane in which the first 5 and second webs 12 lie respectively. As previously mentioned, avoiding oblique surfaces means that construction of the sliding assembly is easier, as is coupling the sliding support assembly to external systems.

A first portion of the first sliding flange 13a is configured to curve towards the first flange 6a, and a first portion of the second sliding flange 13b is configured to curve towards the second flange 6b. This allows the slide member 3, especially if it is carrying a load, to press against the locating assemblies 7a, 7b or balls 16a, 16b which serves to minimize any risk of rattle.

A top portion of the first wall 7a is configured to match the curvature of the first portion of the first sliding flange 13a, and a top portion of the second wall 7b is configured to match the curvature of the first portion of the second sliding flange 13b. The curvature of these features assists in setting the first and second distance and also facilitates inserting the sliding flanges 13a, 13b of the slide member 3 into their respective channels. It also helps ensure that the sliding flanges 13a, 13b or walls 7a, 7b are not damaged by rubbing together.

As seen in FIGS. 4 and 5, the first sliding flange 13a has a first sliding groove 14a to locate the first locating assembly 4a, and the second sliding flange 13b has a second sliding groove 14b to locate the second locating assembly 4b. These sliding grooves 14a, 14b serve to both limit the possible movement of the locating assemblies 4a, 4b and to ensure that the balls 16a, 16b roll on surfaces that are smooth, and at least partially conformal with the balls, thereby minimizing noise and possible rattle. As the ball contacting surfaces 14a, 14b are slightly recessed from the sliding flange surfaces the risk of contamination or scratching of the ball contacting surfaces 14a, 14b is minimized.

As seen in FIG. 1, the slide member 3 is shorter, in the longitudinal direction of the elongate rail, than the elongated rail 2. This aspect, especially when combined with the previously described limiting features, allows for situations in which the travel of the slide member is such that no part of it can protrude beyond the ends of the elongate rail. This simplifies the incorporation of the system into other systems as there is no need to allow for run off space past the ends of the elongate rail.

As can be best seen in FIGS. 1 and 2, the sliding support assembly 1 further comprises: a first locating assembly 4a; and a second locating assembly 4b. The first locating assembly 4a comprises a first retaining strip 15a and a first series of balls 16a, and the second locating assembly 4b comprises a second retaining strip 15a and a second series of balls 16b. The advantage of using strips 15a, 15b is that they are simple shapes which means they are easier, and thus cheaper, to produce than some other common retaining member forms. Such a form is also well suited to be formed from plastic. The first and second series of balls 16a, 16b may be formed from stainless steel.

The first series of balls is lubricated and the second series of balls is lubricated, preferably with oil or grease. Several previous described features, such as the walls 7a, 7b and lips 8a, 8b partially surround the series of balls in the locating assemblies 4a, 4b. This reduces the chance of lubricated surfaces coming into contact with other items which both prevents loss of lubrication and prevents the lubrication contaminating other items. This is particularly important if the sliding assembly 1 is used to provide sliding capability to a storage location, as in this case the walls and lips prevent stored items in the storage location coming into contact with lubricated surfaces.

The first retaining strip 15a bows so that at least a portion of the first retaining strip 15a presses against the first wall 7a, and the second retaining strip 15b bows so that at least a portion of the second retaining strip 15b presses against the second wall 7b. The retaining strips 15a, 15b may be made from an Acetal plastic or Polyoxymethylene (POM), although other common materials, such as nylon, would be well known as possible replacement materials from which to form retaining members to those skilled in the relevant arts. Typically, ensuring that manufactured strips are flat is difficult and expensive, therefore, the ability to use bowed strips is advantageous. Furthermore, the bowing and subsequent continuous contact with the wall avoids the risk of rattling or tapping noises.

Figure 6:
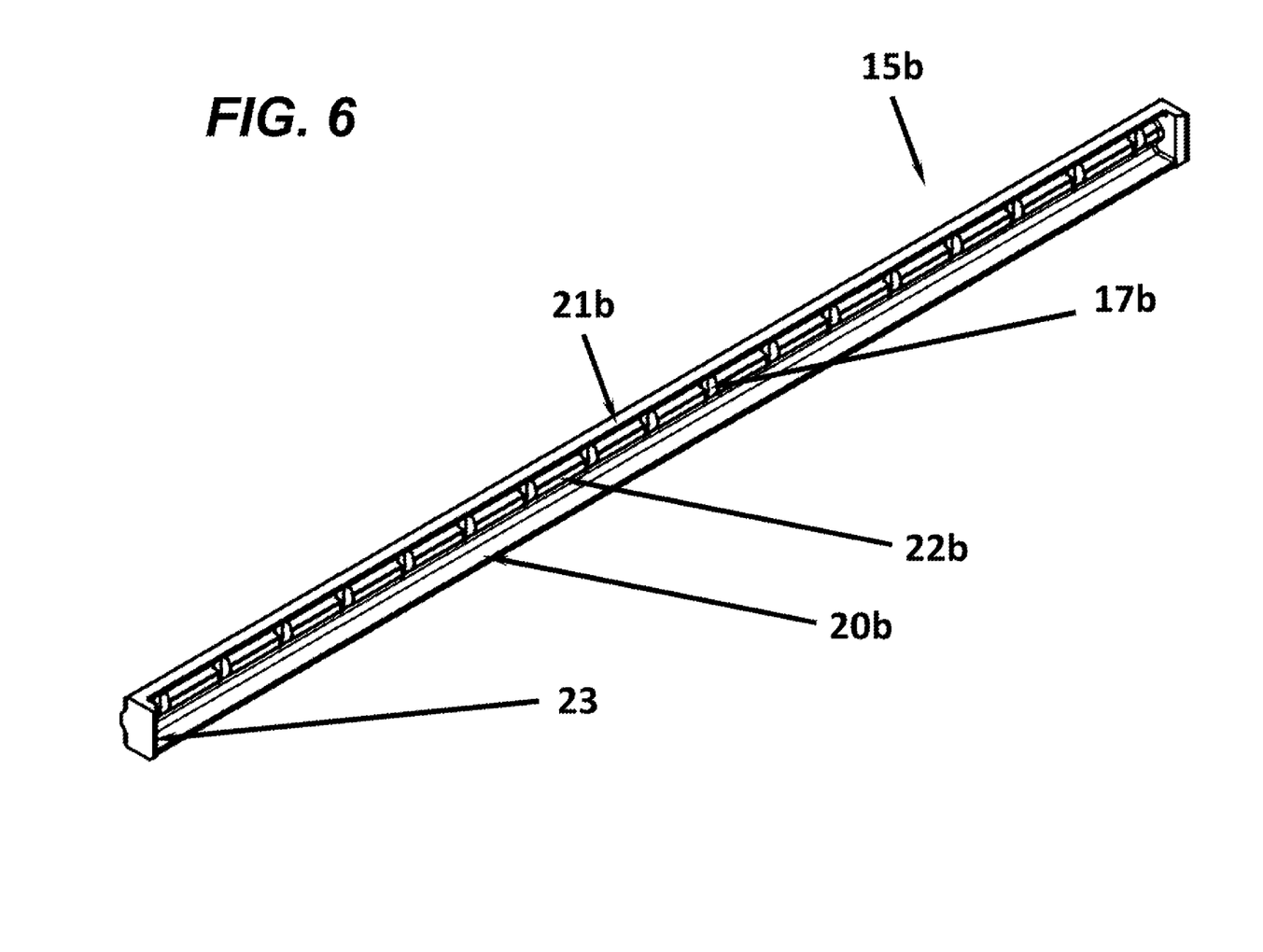
FIG. 6 is a perspective view of a retaining strip which can be used in the sliding support assembly according to the first embodiment of the present invention, or in other sliding support assemblies according to alternative embodiments of the present invention.
Figure 7:
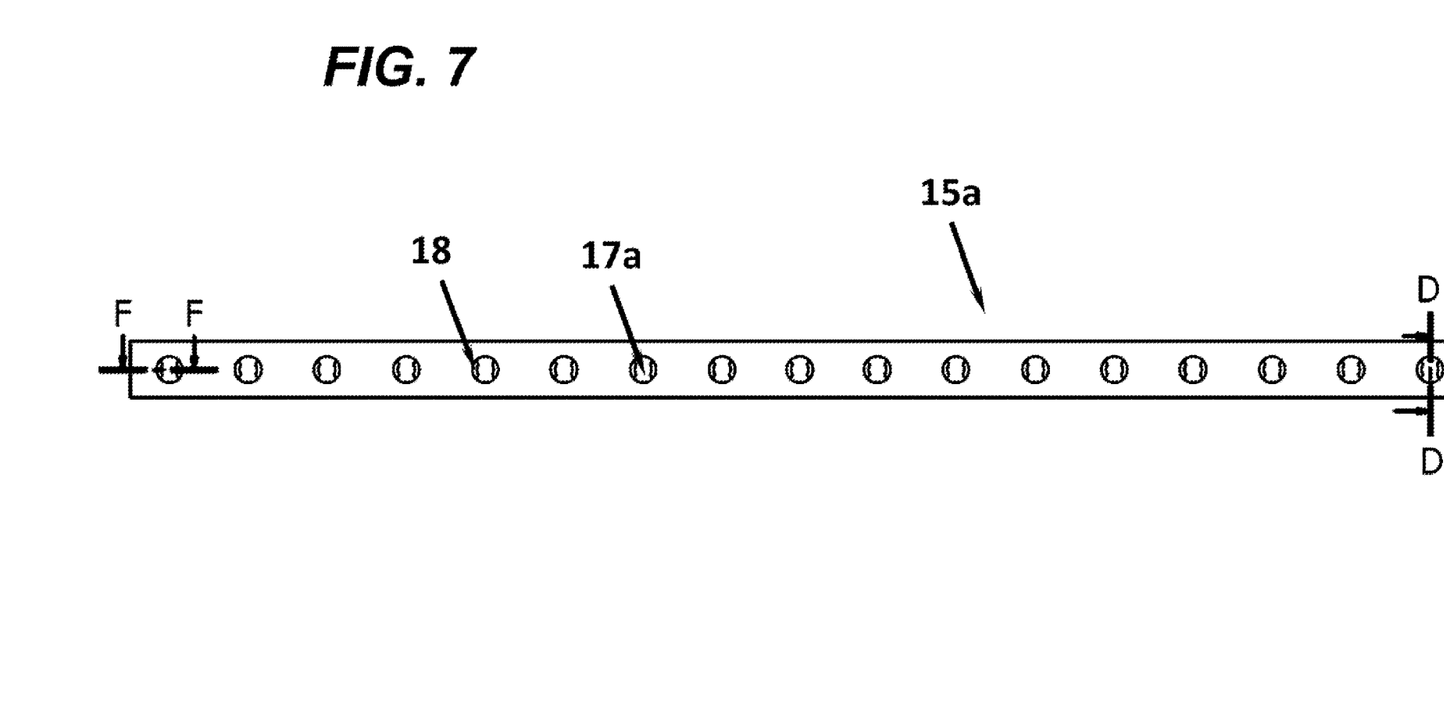
FIG. 7 is a side view of the retaining strip of FIG. 6.

As can be seen in FIGS. 2, 6 and 7, the first series of balls 16a is held in a first series of apertures 17a in the first retaining strip 15a, and the second series of balls 16b is held in a second series of apertures 17b in the second retaining strip 15b. Having the balls 16a, 16b in isolated apertures ensures that should one or more balls fail or be damaged, the remaining balls are not adversely affected or are minimally affected. Having balls in isolated apertures also reduces the risk of noise and wear that would occur if the balls were to come into contact with each other.

The apertures in the first series of apertures 17a are separated by equal distances and the apertures in the second series of apertures 17b are separated by equal distances. Such equal spacing ensures that each ball receives a roughly similar amount of loading during use. It is also possible to use different spacing between apertures to help prevent damage, such as pitting, to the ball contacting surfaces that might occur if the balls were to vibrate.

Figure 9:
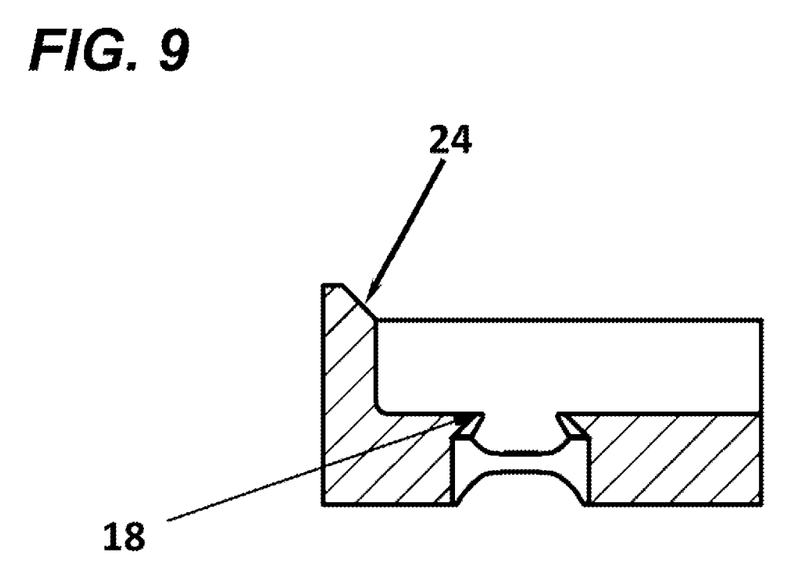
FIG. 9 is a sectional view of the retaining strip taken through the line F-F shown in FIG. 6.

As seen in FIGS. 7 and 9, the first and second series of apertures 17a, 17b have retaining ribs 18 which extend into the apertures to retain the balls in the apertures. The use of retaining strips means that the retaining ribs can be moulded or machined in such a way that they are strong compared to those apertures machined in more complex shaped retaining members. The retaining ribs 18 and the locating strips 4a, 4b confinement in the channels of the elongate rail 2 means that the balls have very little, and practically no, chance of falling out in use.

Figure 8:
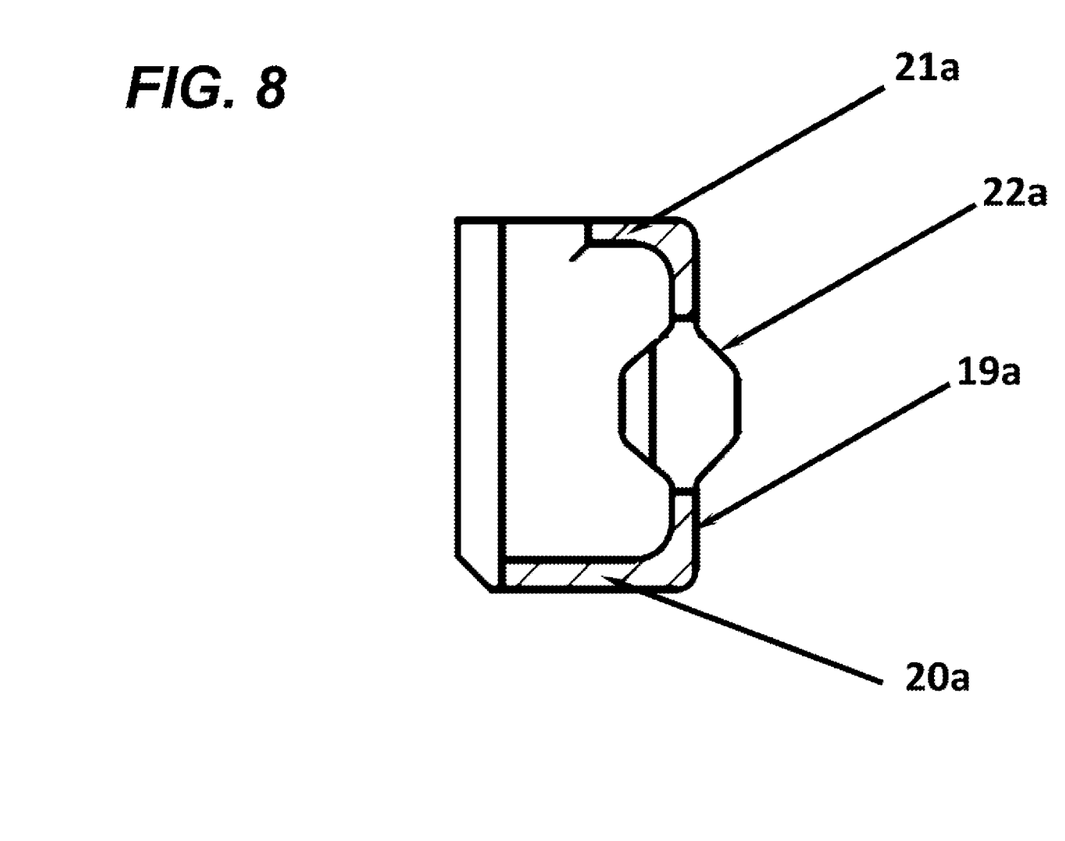
FIG. 8 is a sectional view of the retaining strip taken through the line D-D shown in FIG. 6.

As seen in FIGS. 6 to 8, the first retaining strip 15a comprises a channel section defined by a first side 19a, a first foot 20a, and a first top lip 21a; and the second retaining strip 15b comprises a channel section defined by a second side 19b, a second foot 20b, and a second top lip 21b. Retaining strips 15a, 15b formed in this way are prevented from rotating, around a direction parallel to the longitudinal axis, in the channel as such rotation results in the feet 20a, 20b pushing against the walls 7a, 7a. The top lips 21a, 21b of such formed strips also provide a flat surface for the lips 8a, 8b of the flanges 6a, 6b to contact without imparting any force that might serve to move the retaining strips out of the channels.

The first retaining strip 15a is configured so that the first foot 20a extends further from the first side 19a than the first top lip 21a and the second retaining strip 15a is configured so that the second foot 20b extends further from the second side 19b than the second top lip 21b. This is important to ensure the retaining strips 15a, 15b are prevented from rotating in the channel but still able to receive the sliding flanges 13a, 13b of the slide member 3 into the channel section of the retaining strips 15a, 15b.

As seen in FIG. 8, the first retaining strip 15a is configured so that the first side 19a has a first bulbous portion 22a and the second retaining strip 15b is configured so that the second side 19b has a second bulbous portion 22b. Typically, the first retaining strip 15a is configured so that the first series of apertures 17a is located in the first bulbous portion 22a and the second retaining strip 15b is configured so that the second series of apertures 17b is located in the second bulbous portion 22b. Using such bulbous portions 22a, 22b means that the apertures and retaining ribs 18 are easier to manufacture. The produced ribs are also stronger as there is more surrounding material to support the features. The retaining strips are also strengthened compared to those without bulbous portions. This strengthening serves to partially offset the weakening effect on the retaining strips 15a, 15b of the apertures.

As seen in FIGS. 6 and 9, the second retaining strip 15b has an end wall 23 located at an end of the second retaining strip 15b and similarly the first retaining strip 151 has an end wall 23 located at an end of the first retaining strip 15a. Preferably all ends of the retaining strips terminate in end walls. The one or more end walls 23 provide support to the retaining strips 15a, 15b and substantially seal the ends of the channel section of the retaining strips 15a, 15b thus closing off, or reducing access into, the channel section from the environment outside the channel section of the retaining strips 15a, 15b. This closure serves to prevent objects contaminating the retaining strips 15a, 15b. The one or more end walls 23 may extend further than the top lips 21a, 21b or feet 20a, 20b of the retaining strips 15a, 15b. This extension further improves the sealing of the channel section which helps further protect the ball contacting surfaces 14a, 14b of the sliding flanges 13a, 13b, the series of ball 16a, 16b, or any other features within the channel section of the retaining strips 15a, 15b.

Each end wall 23 has a chamfer 24 on an edge that allows each end wall to be pressed past the limiting feature. This means that should, for whatever reason, an end wall 23 of a retaining strip 15a, 15b end up past, in other words protruding beyond in a longitudinal direction, a limiting feature, it will be possible to force the protruding retaining strip back past the limiting feature by temporarily applying enough force to bypass the limiting feature. The amount of force required is significantly reduced due to the presence of the chamfer 24.

The described sliding support assembly could be modified in a number of ways to facilitate motorized use. For example, the elongate rail 2 may include a rack for coupling to a motor. The sliding support assembly may further comprise a motor and the elongate rail may be slidable by the motor. The motor may be mounted on the slide member so that the elongate rail is slidable by the motor. Alternatively, the rack may be mounted on the slide member and the motor may be mounted on the elongate rail. The use of the retaining strips 15a, 15b provides space in the channel section of the elongate rail or slide member, between the walls or sliding flanges, so that such adaptations may be at least partially placed in the respective channel sections. As a result of this placement, motorizing the sliding support assembly can occur in a fashion that is unobtrusive and changes the outer dimensions of the system in a minimal way.

In use, the slide member slides, or translates linearly, relative to the elongate rail. The sliding occurs in the longitudinal direction which is preferably the direction of extrusion of the elongated rail.

When assembled the slide member is supported by the balls which are received in the grooves in the sliding flanges of the slide member and the grooves in the flanges of the elongate rail. When sufficient force is applied to the slide member in the longitudinal direction this force is transferred to the balls which rotate in their associated groove and thus translate the slide member in the longitudinal direction.

It will be appreciated that the described slide support could be used to support slidingly a wide variety of bodies. Various cut out shapes and threaded holes are apparent in the drawings in both the second web of the slide member and the first web of the elongate rail. These modifications or customizations and their equivalents, serve a wide variety of purposes, such as allowing mounting of components or reducing weight, and all would be clear to a skilled person. In one example use, the sliding support may be used to support slidingly an armrest, preferably the armrest may be motorized and more preferably it may be used in an automotive application.

The invention claimed is:

1. A sliding support assembly, comprising:
an elongate rail, a slide member slidable in a longitudinal direction relative to the elongate rail, and first and second locating assemblies, wherein
the first locating assembly comprises a first retaining strip and a first series of balls, and the second locating assembly comprises a second retaining strip and a second series of balls, wherein the first retaining strip is separate from the second retaining strip, and
the elongate rail comprising:
a channel section defined by a first web, a first flange, and a second flange;
a first wall; and
a second wall;
wherein the first flange and a first side of the first wall define a first channel for retaining the first locating assembly therein, and the second flange and a first side of the second wall define a second channel for retaining the second locating assembly therein, wherein the first retaining strip bows so that at least a portion of the first retaining strip presses against the first side of the first wall, and the second retaining strip bows so that at least a portion of the second retaining strip presses against the first side of the second wall.

2. The sliding support assembly of claim 1, wherein the first flange has a first lip configured to partially surround the first locating assembly, and the second flange has a second lip configured to partially surround the second locating assembly.

3. The sliding support assembly of claim 2, wherein a top of the first wall and an end of the first lip are separated by a first distance, and a top of the second wall and an end of the second lip are separated by a second distance, wherein each of the first distance and the second distance is 5.5 mm.

4. The sliding support assembly of claim 2, wherein in the longitudinal direction of the elongate rail: the first wall does not extend to an end of the elongated rail, and the second wall does not extend to an end of the elongate rail.

5. The sliding support assembly of claim 2, wherein an end of the elongate rail, in the longitudinal direction of the elongate rail, has a limiting feature for limiting movement of the slide member.

6. The sliding support assembly of claim 1, wherein in the longitudinal direction of the elongate rail: the first wall does not extend to an end of the elongated rail, and the second wall does not extend to an end of the elongate rail.

7. The sliding support assembly of claim 1, wherein an end of the elongate rail, in the longitudinal direction of the elongate rail, has a limiting feature for limiting movement of the slide member.

8. The sliding support assembly of claim 1, wherein the slide member comprises a channel section defined by a second web, a first sliding flange, and a second sliding flange, wherein a first portion of the first sliding flange is configured to curve towards the first flange, and a first portion of the second sliding flange is configured to curve towards the second flange.

9. The sliding support assembly of claim 8, wherein a top portion of the first wall is configured to match a curvature of the first portion of the first sliding flange, and a top portion of the second wall is configured to match a curvature of the first portion of the second sliding flange.

10. The sliding support assembly of claim 1, wherein the first series of balls is held in a first series of apertures in the first retaining strip, and the second series of balls is held in a second series of apertures in the second retaining strip, wherein the first and second retaining strips include retaining ribs which extend into the first and second series of apertures to retain the first and second series of balls in the first and second series of apertures.

11. The sliding support assembly of claim 1, wherein the first retaining strip comprises a channel section defined by a first side, a first foot, and a first top lip; and the second retaining strip comprises a channel section defined by a second side, a second foot, and a second top lip, wherein the first foot extends further from the first side than the first top lip, and the second foot extends further from the second side than the second top lip.

12. The sliding support assembly of claim 1, wherein the first retaining strip has an end wall located at an end of the first retaining strip, and the second retaining strip has an end wall located at an end of the second retaining strip, and an end of the elongate rail, in the longitudinal direction of the elongate rail, has a limiting feature for limiting movement of the slide member, wherein each said end wall has a chamfer on an inner edge thereof that allows each said end wall to be pressed past the limiting feature.

13. A sliding support assembly, comprising:
an elongate rail, a slide member slidable in a longitudinal direction relative to the elongate rail, and first and second locating assemblies, wherein
the first locating assembly comprises a first retaining strip and a first series of balls, and the second locating assembly comprises a second retaining strip and a second series of balls, and
the elongate rail comprising:
a channel section defined by a first web, a first flange, and a second flange;
a first wall; and
a second wall;
wherein the first flange and a first side of the first wall define a first channel for retaining the first locating assembly therein, and the second flange and a first side of the second wall define a second channel for retaining the second locating assembly therein, wherein the first retaining strip bows so that at least a portion of the first retaining strip presses against the first side of the first wall, and the second retaining strip bows so that at least a portion of the second retaining strip presses against the first side of the second wall;

wherein the first retaining strip has an end wall located at an end of the first retaining strip, and the second retaining strip has an end wall located at an end of the second retaining strip, and wherein an end of the elongate rail, in the longitudinal direction of the elongate rail, has a limiting feature for limiting movement of the slide member, wherein each said end wall has a chamfer on an inner edge thereof that allows each said end wall to be pressed past the limiting feature.

* * * * *